(12) United States Patent
Fu et al.

(10) Patent No.: US 6,350,721 B1
(45) Date of Patent: Feb. 26, 2002

(54) FLUIDS AND TECHNIQUES FOR MATRIX ACIDIZING

(75) Inventors: Diankui Fu, Missouri City, TX (US); Roger J. Card, Paris (FR)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/203,301

(22) Filed: Dec. 1, 1998

(51) Int. Cl.[7] .................................................. C09K 3/00
(52) U.S. Cl. .................. 507/242; 507/237; 507/240; 507/243; 507/257; 507/203; 507/277; 507/933
(58) Field of Search ................. 507/237, 240, 507/242, 243, 257, 933, 200, 203, 277

(56) References Cited

U.S. PATENT DOCUMENTS

| | | |
|---|---|---|
| 1,877,504 A | 9/1932 | Grebe et al. |
| 2,011,579 A | 8/1935 | Heath et al. |
| 2,094,479 A | 8/1937 | Vandergrift |
| 2,446,331 A | 8/1948 | Hurley |
| 2,802,531 A | 8/1957 | Cardwell et al. |
| 2,888,988 A | 6/1959 | Clark |
| 3,044,959 A | 7/1962 | Martin |
| 3,153,450 A | 10/1964 | Foster et al. |
| 3,245,470 A | 4/1966 | Henry |
| 3,310,112 A | 3/1967 | Nielson et al. |
| 3,634,237 A | 1/1972 | Crenshaw et al. |
| 3,709,295 A | 1/1973 | Braunlich et al. |
| 4,624,754 A | 11/1986 | McManis et al. |
| 5,402,846 A | 4/1995 | Jennings et al. |
| 5,551,516 A | 9/1996 | Norman et al. |
| 5,552,241 A | 9/1996 | Mamantov et al. |
| 5,731,101 A | 3/1998 | Sherif et al. |
| 5,827,602 A | 10/1998 | Koch et al. |

OTHER PUBLICATIONS

Gordon et al., Journal of the American Chemical Society, vol. 100, No. 24, pp. 7445–7454, (1978).*

Gordon, J.E., et al., Fused Organic Salts, 8. Properties of Molten Straight–Chain Isomers of Tetra–n–pentylammonium Salts, Journal of the American Chemical Society, 1978, vol. 100, No. 24, pp. 7445–7454.

Baum, Rudy. "The Engineering Approach to Molecular Biology", C&EN (Mar. 30, 1998) p. 38.

Chauvin et al. "Nonaqueous Ionic Liquids as Reaction Solvents", Chemtech (Sep. 1995) pp. 26–30.

Freemantle, Michael. "Designer Solvents: Ionic Liquids May Boost Clean Technology Development", C&EN (Mar. 30, 1998) pp. 32–37.

(List continued on next page.)

Primary Examiner—Philip Tucker
(74) Attorney, Agent, or Firm—Douglas Y'Barbo; Robin C. Nava; Thomas O. Mitchell

(57) ABSTRACT

Liquids comprised solely of anions and cations ("ionic liquids") are disclosed as novel components of fluids (and techniques relying upon those fluids) for stimulation of hydrocarbon wells. In particular, the fluids disclosed are useful in matrix acidizing. Formation of the ionic liquids of the present Invention is highly exothermic, hence the heat generated can be used, for instance, to melt de-watered drilling fluid in the near-wellbore region of the formation. Further, reaction of the ionic liquids with water results in acid generation; this acid can be used to, for instance, to stimulate a formation, either by conventional matrix acidizing or fracture acidizing. In addition, certain preferred species of the ionic liquids of the present Invention are highly stable solvents, hence they can be used as carrier fluids for highly reactive super acids (e.g., $SbF_5$+HF) in connection with matrix acidizing.

27 Claims, 2 Drawing Sheets

1-ethyl-3-methylimidazolium tetrachloroaluminate 1-butylpyridinium nitrate 1-ethyl-3-methylimidazolium tetrafluroborate 1-butylpyridinium hexafluorophosphate

OTHER PUBLICATIONS

Huddleston et al. "Room Temperature Ionic Liquids as Novel Media for 'Clean' Liquid–Liquid Extraction", *Chem. Commun.* (1998) pp. 1765–1766.

Hussey, Charles L. "Room Temperature Molten Salt Systems", *Adv. Molten Salt Chem.*, vol. 5 (1983) pp. 185–230.

Hussey, Charles L. "Room Temperature Haloaluminate Ionic Liquids. Novel Solvents for Transition Metal Solution Chemistry", *Pure and Applied Chemistry*, vol. 60, No. 12 (Dec. 1988), pp. 1763–1772.

Seddon, K.R. "Room–Temperature Ionic Liquids: Neoteric Solvents for Clean Catalysis" *Kinetics and Catalysis*, vol. 37, No. 5 (1996) pp. 693–697.

Seddon, Kenneth R. "Ionic Liquids for Clean Technology", *J. Chem. Tech. Biotechnol.* vol. 68(1997), pp. 351–356.

Sun, J., et al. "Room–Temperature Molten Salts Based on the Quaternary Ammonium Ion", *J. Phys. Chem. B.*vol. 102 (1998). pp. 8858–8864.

Williams, et al, "Chapter 1: History of Acidizing"; "Chapter 2: Acidizing Methods"; "Chapter 3: Acid Types and the Chemistry of Their Reactions". *Acidizing Fundamentals.* Dallas: Society of Petroleum Engineers, 1979, pp. 1–12.

Williams, et al, "Chapter 7: Acid Fracturing Treatment Design", *Acidizing Fundamentals.* Dallas: Society of Petroleum Engineers, 1979, pp. 53–67.

\* cited by examiner

[AlCl$_4$]$^-$ 1-ethyl-3-methylimidazolium tetrachloroaluminate

[NO$_3$]$^-$ 1-butylpyridinium nitrate

[BF$_4$]$^-$ 1-ethyl-3-methylimidazolium tetrafluroborate

[PF$_6$]$^-$ 1-butylpyridinium hexafluorophosphate

FLUIDS AND TECHNIQUES FOR MATRIX ACIDIZING

TECHNICAL FIELD OF THE INVENTION

This Invention relates to the stimulation of hydrocarbon wells and in particular to the fluids and methods used in treating a damaged formation using acid-type fluids, and other fluids of similar function.

BACKGROUND OF THE INVENTION

1. Introduction to the Technology

Hydrocarbons (oil, natural gas, etc.) are obtained from a subterranean geologic formation (i.e., a "reservoir") by drilling a well that penetrates the hydrocarbon-bearing formation. This provides a partial flowpath for the oil to reach the surface. In order for oil to be "produced," that is travel from the formation to the wellbore (and ultimately to the surface) there must be a sufficiently unimpeded flowpath from the formation to the wellbore. This flowpath is through the formation rock—e.g., sandstone, carbonates—which has pores of sufficient size and number to allow a conduit for the oil to move through the formation.

Hence, one of the most common reasons for a decline in oil production is "damage" to the formation that plugs the rock pores and therefore impedes the flow of oil. This damage generally arises from another fluid deliberately injected into the wellbore, for instance, drilling fluid. Even after drilling, some drilling fluid remains in the region of the formation near the wellbore, which may dehydrate and form a coating on the wellbore. The natural effect of this coating is to decrease permeability to oil moving from the formation in the direction of the wellbore.

Another reason for lower-than-expected production is that the formation is naturally "tight," (low permeability formations) that is, the pores are sufficiently small that the oil migrates toward the wellbore only very slowly. The common denominator in both cases (damage and naturally tight reservoirs) is low permeability. Techniques performed by hydrocarbon producers to increase the net permeability of the reservoir are referred to as "stimulation." Essentially, one can perform a stimulation technique by: (1) injecting chemicals into the wellbore to react with and dissolve the damage (e.g., wellbore coating); (2) injecting chemicals through the wellbore and into the formation to react with and dissolve small portions of the formation to create alternative flowpaths for the hydrocarbon (thus rather than removing the damage, redirecting the migrating oil around the damage); or (3) injecting chemicals through the wellbore and into the formation at pressures sufficient to actually fracture the formation, thereby creating a large flow channel though which hydrocarbon can more readily move from the formation and into the wellbore. The present Invention is directed primarily to the second of these three processes.

Thus, the present Invention relates to methods to enhance the productivity of hydrocarbon wells (e.g., oil wells) by removing (by dissolution) near-wellbore formation damage or by creating alternate flowpaths by dissolving small portions of the formation. Generally speaking, acids, or acid-based fluids, are useful in this regard due to their ability to dissolve both formation minerals and contaminants (e.g., drilling fluid coating the wellbore or that has penetrated the formation) which were introduced into the wellbore/formation during drilling or remedial operations.

2. The Prior Art

At present, acid treatments are plagued by three serious limitations: (1) radial penetration; (2) axial distribution; and (3) corrosion of the pumping and well bore tubing. The first problem, radial penetration, is caused by the fact that as soon as the acid is introduced into the formation (or wellbore) it reacts very quickly with the wellbore coating, or formation matrix (e.g., sandstone or carbonate). In the case of treatments within the formation (rather than wellbore treatments) the formation near the wellbore that first contacts the acid is adequately treated, though portions of the formation more distal to the wellbore (as one moves radially, outward from the wellbore) remain untouched by the acid—since all of the acid reacts before it can get there. For instance, sandstone formations are often treated with a mixture of hydrofluoric and hydrochloric acids at very low injections rates (to avoid fracturing the formation). This acid mixture is often selected because it will dissolve clays (found in drilling mud) as well as the primary constituents of naturally occurring sandstones (e.g., silica, feldspar, and calcareous material). In fact, the dissolution is so rapid that the injected acid is essentially spent by the time it reaches a few inches beyond the wellbore. Thus, it has been calculated that 117 gallons of acid per foot is required to fill a region five feet from the wellbore (assuming 20% porosity and 6-inch wellbore diameter). See, Acidizing Fundamentals, 5,6, In Acidizing Fundamentals SPE (1994). Yet, a far greater amount of acid would that this would be required to achieve radial penetration of even a single foot, if a conventional fluid (HCl) were used. Similarly, in carbonate systems, the preferred acid is hydrochloric acid, which again, reacts so quickly with the limestone and dolomite rock, that acid penetration is limited to a few inches to a few feet. In fact, due to such limited penetration, it is believed matrix treatments are limited to bypassing near-wellbore flow restrictions—i.e., they do not provide significant stimulation beyond what is achieved through (near-wellbore) damage removal. Yet damage at any point along the hydrocarbon flowpath can impede flow (hence production). Id. Therefore, because of the prodigious fluid volumes required, these treatments are severely limited by their cost.

In response to this "radial penetration" problem, organic acids (e.g., formic acid, acetic acid) are sometimes used, since they react more slowly than mineral acids such as HCl. Organic acids are an imperfect solution though—since they react incompletely, plus they are expensive.

A third general class of acid treatment fluids (the first two being mineral acids and organic acids) have evolved in response to the need to reduce corrosivity and prolong the migration of unspent acid radially away from the wellbore. This second general class of compounds are often referred to as "retarded acid systems." The common idea behind these systems is that the acid reaction rate is slowed down for instance, by gelling the acid, oil-wetting the formation, or emulsifying the acid with an oil. Each of these approaches also has significant problems which limit their use.

Gelling agents, though they should, in theory, retard acid reaction rate, are seldom used in matrix acidizing since the increased viscosity makes the fluid more difficult to pump. Similarly, chemically retarded acids (e.g., prepared by adding an oil-wetting surfactant to acid in an effort to create a barrier to acid migration to the rock surface) often require continuous injection of oil during the treatment. Moreover these systems are often ineffective at high formation temperatures and high flow rates since absorption of the surfactant on the formation rock is diminished. Emulsified acid systems are also limited by increased frictional resistance to flow.

The second significant limitation of acid treatments is axial distribution. This refers to the general desirability to limit the movement of the acid solution axially, so that it does not intrude upon other zones, in particular, water-saturated zones. Any fluid that migrates away from its intended target (i.e., the desired hydrocarbon flowpath, or the damaged region) means that more fluid must be pumped into the formation, therefore increasing treatment cost. A conventional mineral acid treatment (e.g., HCl) has very high miscibility with an aqueous phase relative to the organic- (or hydrocarbon-) bearing phase, and therefore the potential (and undesirable) migration of the HCl-based fluid into a water-saturated zone, is a serious concern. Therefore, an acid fluid having very low miscibility with an aqueous (water) phase is highly desirable.

Another ubiquitous problems that limits the desirability of acid treatments is the corrosion of the pumping equipment and well casings, caused by contact with the acid (worse in the case of more concentrated solutions of mineral acids. To solve the corrosion problem, conventional acid treatments often add a corrosion inhibitor to the fluid; however, this can significantly increase the cost of a matrix acidizing treatment.

The point of novelty of the present Invention resides in the incorporation of an extraordinary family of compounds into fluids for various stimulation and workover techniques. The family of compounds is known generally as "ionic liquids." This term refers to compounds that: (1) are liquid at ambient temperatures; and (2) are composed entirely of cations and anions (as opposed to a molecular liquid, such as benzene, or an ionic solution, such as $Na^+$ $Cl^-$ dissolved in water). Though matrix treatment fluids—nor indeed, any fluids related to oilfield applications—that incorporate ionic liquids have not been disclosed prior to the present Invention, ionic fluids are known substances.

Among the first to disclose ionic liquids were Hurley and Weir in a family of United States Patent applications, including, U.S. Pat. Nos. 2,446,331; 2,446,339; and 2,446,350, that issued about 40 years ago. These applications disclosed ionic liquids for use as conducting baths in aluminum electroplating. Over the years, new species of ionic liquids have been identified, and new applications for them have emerged. These include: support for catalysis; an organic solvent in catalysis, organic synthesis, and chemical separations; electroplating, and non-aqueous batteries. See, e.g., U.S. Pat. No. 5,827,602, Hydrophobic Ionic Liquids, assigned by Covalent Associates Incorporated (1998); and, M. Freemantle, Designer Solvents: Ionic Liquids May Boost Clean Technology Development, Chem. & Engr. News London, Mar. 30, (1998).

The primary fluids used in acid treatments are mineral acids such as hydrochloric acid, which was disclosed as the fluid of choice in a patent issued over 100 years ago (U.S. Pat. No. 556,669, Increasing the Flow of Oil Wells, issued to Frasch, H.). At present, hydrochloric acid is still the preferred acid treatment in carbonate formations. For sandstone formations, the preferred fluid is a hydrochloric/hydrofluoric acid mixture.

Again, the major drawback of these acids are that they react too quickly and hence penetrate (as unspent acid) into the formation poorly. Second, they are highly corrosive to wellbore tubular components. Organic acids are a partial response to the limitations of mineral acids. The principal benefit of the organic acids are lower corrosivity and lower reaction rate (which allows greater radial penetration of unspent acid). The organic acids used in conventional treatments are formic acid and acetic acid. Both of these acids are have numerous shortcomings. First, they are far more expensive than mineral acids. Second, while they have a lower reaction rate, they also have a much lower reactivity—in fact, they do not react to completion, but rather an equilibrium with the formation rock is established. Hence one mole of HCl yields one mole of available acid (i.e., $H^+$), but one mole of acetic acid yields substantially less than one mole of available acid.

As evidenced by this discussion, numerous techniques have been proposed/developed to control acid reactivity—i.e., so that the acid does react completely near the wellbore, but remains chemically active as the fluid is propagated radially into the formation—to achieve acceptable axial distribution, and to mitigate corrosion. Each is an imperfect solution at best. Therefore, an acid fluid in which the reactivity could be carefully controlled as the fluid propagates from the wellbore and radially into the formation, which is easy to pump (i.e., does not need to be gelled), which has acceptable axial distribution, and which has low corrosivity, is a long-sought after, and highly desirable goal in acid treatment.

SUMMARY OF THE INVENTION

The common denominator of every stimulation technique that comprises the present Invention is that they each involve the use of a remarkable class of compounds generally known as "ionic liquids." Ionic liquids are distinguished from (1) "molecular liquids" (e.g., carbon tetrachloride) and (2) "solutions" which contain dissolved electrolytes (e.g., $Na^+$ $Cl^-$ in water) in that, in the case of an ionic liquid, the entire liquid is composed of cations and anions—i.e., it is a homogeneous liquid having those two components (hence also the term "molten salts"). Thus, pure water would not qualify as an ionic liquid since it consists of $H_2O$ molecules, rather than ions. Nor would an $Na^+$ $Cl^-$ solution qualify since it consists of $H_2O$ molecules and $Na^+$ and $Cl^-$ ions. Ionic liquids shall be discussed in far more detail in the Detailed Description later in the Specification.

Therefore, in the most general sense, the Invention resides in the use of ionic liquids in stimulation and workover operations, and in particular, in matrix acidizing treatments.

As the following text shall illustrate, four primary, distinct modes of action possessed by ionic liquids are exploited in the present Invention. Not all modes of action are implicated in a given stimulation or workover application, though some particular application may rely upon all four modes of action; some rely upon only one. These modes of action are: (1) dissolution by the ionic liquid; (2) heat formation upon ionic liquid generation; (3) ionic liquid as a carrier solvent for a reactive agent; and (4) acid generation by reaction of ionic liquid with water. The first mode of action, dissolution, exploits the excellent solubility characteristics of ionic liquids to dissolve an extraordinarily broad range of materials, both organic (polar, non-polar, and charged, e.g., scleroglucan and xanthan polymer) and inorganic (e.g., calcium carbonate-based rock). The second mode of action relies upon a peculiar feature of the synthesis of ionic liquids, namely that substantial heat is released during ionic liquid formation (depending upon the ionic liquid being synthesized). Indeed, we have found through laboratory testing that the quantity of heat released during the progress of this exothermic reaction is sufficient to melt paraffin, sludge, and wax, which are ubiquitous and also very-difficult-to-remove wellbore contaminants. Third, ionic liquids—again depending upon the particular species and the solute one has in mind—are excellent (e.g., highly stable, inert) solvents; therefore, they can be used to transport highly reactive substances such as super acids (e.g., HF+SbF$_5$). Fourth, some, though not all ionic liquids generate prodigious quantities of acid upon reaction with water. This mode of action can be exploited in applications that require the introduction of acid into the wellbore. Moreover, more than one of these four mechanisms can be exploited in a single treatment. For instance, an ionic liquid-based fluid of the present Invention can be pumped into a wellbore; the ionic fluid then dissolves portions of the formation (e.g., carbonate) near the wellbore thereby creating alternate flowpaths for hydrocarbon to move from the formation into the wellbore. Next, water can be pumped into the wellbore to contact the ionic liquid, which would result in acid generation. The acid would then further degrade the carbonate as well as the polymer damage (e.g., scleroglucan, starch, xanthan—i.e., drilling fluid residue).

The fluids of the present Invention provide several substantial advantages over state-of-the-art stimulation and workover fluids. First, a dramatic and unusual attribute of the fluids of the present Invention is that when combined with water, an acid is generated. Hence, an ionic liquid of the present Invention can be pumped into the wellbore, followed by water—i.e., the water and ionic liquid can be combined within the wellbore. The significance of this is that no acid is generated at the surface. Therefore, the pumps, storage tanks, well casings, and so forth—which are extraordinarily expensive to replace—are not damaged due to corrosion caused by acid, as they are in convention acid treatments. Second, even if the water and ionic liquid are combined at the surface and pumped downhole, acid generation is still delayed (i.e. acid generation is slow as evidenced by laboratory results discussed below), which means that more of the acid will reach distal regions of the formation.

A second significant advantage of the present Invention is that acid generation can be carefully controlled. This is because acid does not form until the ionic liquid is combined with water; and therefore, acid generation can be increased or decreased by modifying the rate of addition of either of these components into the wellbore. Indeed, a major limitation of conventional acid treatments (either acid fracturing or matrix stimulation) is that the acid is too quickly consumed once injected into the formation, and so the matrix immediately adjacent to the wellbore is stimulated, but not further beyond the wellbore. Therefore, what is desired is a fluid that does not react completely with the surrounding matrix but will react slowly as it propagates from the wellbore radially into the formation, so that some of the unreacted acid remains at extreme distal locations from the wellbore, where formation stimulation is also desired.

A third significant advantage of the present Invention is that it has a drastically lower corrosivity compared with conventional acid treatments. Acids attack the storage tanks, pumps, as well as wellbore casings. Replacement and repair of these goods is a major expense directly related to acid treatment. Therefore, a corrosion inhibitor is typically added to acid treatment fluids. For instance, dodecylpyridinium chloride and octylpyridinium bromide solutions as proven corrosion inhibitors used in matrix treatment fluids. Generally speaking, the corrosion inhibitor is a significant portion of the total expense of acid treatments. Indeed, upon addition of water to a particularly preferred ionic liquid of the present Invention (e.g., 1-ethyl-3-methylimidazolium tetrachloaluminate) acid is of course generated, along with a pyridinium salt—which is a proven, effective corrosion inhibitor. Therefore, preferred species of the ionic liquids of the present Invention generate their own corrosion inhibitor, and therefore there may often be no need to add an inhibitor. This will result in a major cost advantage of the ionic liquid-based fluids of the present Invention.

Therefore, the present Invention substantially solves these three primary problems that have plagued acid-stimulation techniques since their inception. First, since the acid is generated in situ, or within the formation, rather than at the surface, then acid never contacts the storage tanks, pumps, or (uppermost) well casing, and therefore the acid stimulation techniques of the present Invention have the advantage over conventional techniques of not corroding these materials, which are very costly to replace. Second, since acid generation can be controlled by the rate or extent of water addition (or ionic liquid addition) then acid generation can be controlled in such a way that it is not immediately consumed upon contact with the formation. The purpose of an acid treatment is to remove formation damage along as much of the hydrocarbon flow path as possible. An effective treatment must therefore remove as much damage as possible along the entire flow path (i.e., from the wellbore extending radially into the formation). Using the fluids and techniques of the present Invention, the acid will have a greater penetration distance, therefore extend along a greater portion of the hydrocarbon flow path, and therefore resulting in a more effective treatment. Third, many preferred species of ionic liquids are completely miscible with an organic phase, in preference to an aqueous phase. Therefore, the problem of axial distribution that plagues conventional (HCl) treatment is substantially mitigated.

DETAILED DESCRIPTION OF THE PREFERRED EMBODIMENTS

The Advantageous Properties of Ionic Liquids

Figure 1:
FIG. 1 is a general reaction schematic showing the preparation of an ionic liquid of the present Invention (above) and the general schematic for acid generation (below).
Figure 1:
Figure 2:
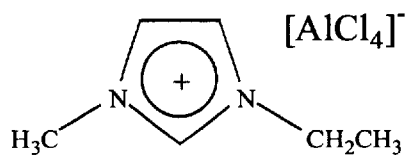
FIG. 2 is shown four exemplary ionic liquids which comprise the fluids of the present Invention; shown clockwise from top left is 1-ethyl-31methylimidazolium tetrachloroaluminate, 1-butylpyridimium nitrate, 1-3-ethyl-3-methylimidazolium tetrafluoroborate, and 1-butylpyridimium hexafluorophosphate.
Figure 2:
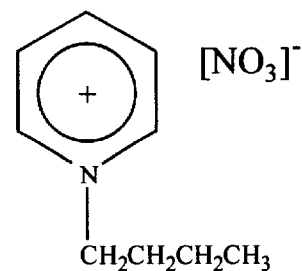
Figure 2:
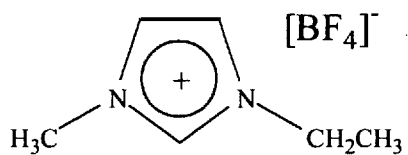
Figure 2:
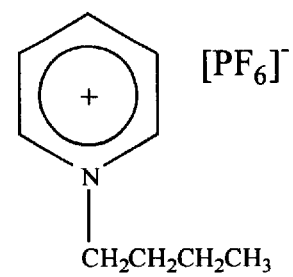
Figure 3:
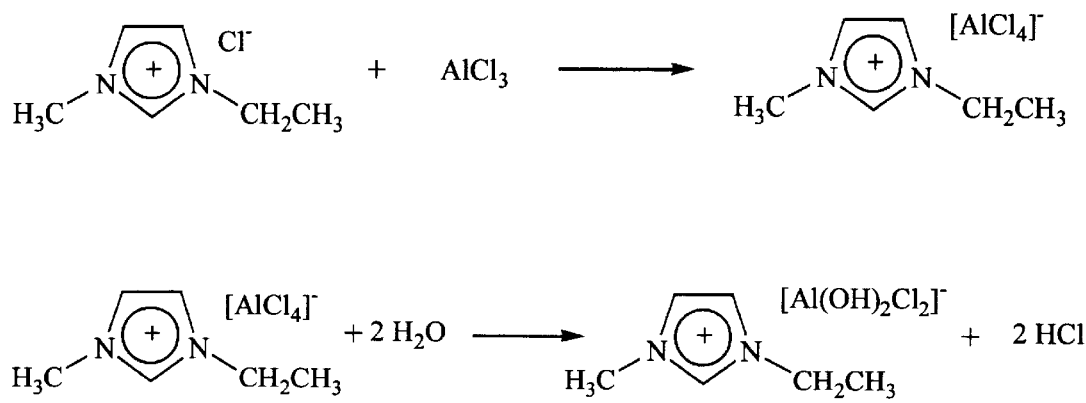
FIG. 3 is a exemplary analog to FIG. 1; it shows 1-ethyl-3-methylimidazolium chloride reacting with aluminum trichloride to form 1-3-ethyl-3-methylimidazolium tetrachloroaluminate (above) and the reaction of that ionic liquid with water to form acid.

Five primary attributes of ionic liquids are largely responsible for the advantages of the stimulation and workover techniques of the present Invention compared with conventional techniques. First, the ionic liquid-based fluids of the present Invention have the remarkable property of generating acid very slowly. The engineer can further control the rate of acid generation by controlling water addition to the ionic liquid performance of the workover or stimulation operation. The ability of the ionic liquid-based fluids of the present Invention to generate acid slowly should not be confused with the incomplete acid generation of organic acids (e.g., acetic acids). Indeed the fluids of the present Invention are far superior to organic acids, particularly in this regard. In addition, the ionic liquids of the present Invention generate acid slowly, but that is due primarily due to a kinetic constraint, not a thermodynamic one. Moreover, at completion, one mole of a preferred species of the ionic liquid-based fluids of the present Invention (e.g., the anion is $AlCl_4^-$) generates three moles of acid—by contrast, one mole of acetic acid generates (if it went to completion) only one mole of acid.

Second, ionic liquids are formed by reaction of, for instance, a metal complex (e.g., $AlCl_3$) and a salt (e.g., $R_4N^+/Cl^-$). Upon combination of these two ingredients, a tremendous amount of heat is generated (i.e., the reaction is highly exothermic). This heat can be used to melt, for instance, contaminant layers coating wellbores. This is particularly useful for materials that are resistant to acid degradation. And it is particularly useful in the case of a two-component contaminant layer—where one component is resistant to acid, but the other is not. Hence, in one embodiment of the present Invention, the two ingredients used to prepare the ionic liquid can be injected into the wellbore and allowed to mix, resulting in heat generation, which will melt the first component of the contaminant layer. Then water can be pumped into the wellbore, resulting in acid generation, to remove the second component of the contaminant layer. A third primary attribute of ionic liquids responsible for the advantages of the present Invention is the remarkable stability of the ionic liquids. This attribute allows ionic liquids to act as highly effective inert carrier solvents for very strong acids. A fourth primary attribute is the immiscibility of ionic liquids with water (though not all ionic liquid species are immiscible with water). Because of this, stimulation or workover fluids based on ionic fluids exhibit excellent zonal control (or acid distribution)—that is, they have little affinity for water-saturated zones, hence they remain in the hydrocarbon-saturated zone, where the treatment is desired.

Fifth, the ionic liquid-based fluids of the present Invention, at least in the case of certain preferred species (e.g., pyridinium-based species) do not require the addition of costly corrosion inhibitors, since they intrinsically generate their own inhibitor upon the addition of water. Moreover, and related to this, the fluids are expected to corrode less since acid is generated slowly, hence very little acid is in contact with upstream components (e.g., storage tanks, pumps, upper-wellbore casings). Finally, the ionic liquids that make up the novel treatment fluids of the present Invention exhibit very minimal corrosivity.

Three Distinct Techniqiues of Matrix Acidizing Using the Fluids of the Present Invention The ionic liquid based-fluids of the present Invention are operable in conjunction with three distinct sets of matrix acidizing techniques. Each set exploits a different mode of action of ionic liquids. In the first set of techniques, the ionic liquids are hydrolyzed (either on the surface, in the wellbore or in the formation, though preferably in the formation) therefore releasing acid. In the second set of techniques, an ionic liquid-based fluid is injected into the formation and allowed to contact the matrix. The formation rock is dissolved by the powerful solvent capacity of certain species of ionic liquids. In the third set of techniques, the ionic liquid-based fluid is comprised of an ionic liquid—chosen for its stability as an inert carrier solvent—and, for instance, a "super acid," such as $SbF_5+HF$. Naturally, two or indeed all three different sets of techniques can be combined sequentially in a single treatment on a single well.

Preferred Species

Again, the novelty of the present Invention resides in the use of a class of compounds known as ionic liquids, in various hydrocarbon-bearing formation stimulation and workover techniques. In this section, preferred species of ionic liquids are discussed. Representative literature references providing a more detailed discussion of the preferred species are provided where appropriate. Each such literature reference is hereby incorporated by reference in its entirety for the particular proposition mentioned immediately prior to each reference; moreover, the portion of the reference mentioned in the citation is particularly emphasized. Below, Table 1 lists some physical properties relevant to oilfield applications, for typical ionic liquids of the present Invention, compared with physical properties of other substances that comprise traditional wellbore/matrix treatment fluids.

TABLE 1

| Physical Properties | Ionic liquid | Acid (HCl, HF) | Organic Solvent (Xylene, Benzene) | Salt (NaCl) |
| --- | --- | --- | --- | --- |
| Liquid range | −90° C. to 300° C. | <−90° C. | −12° C. to 130° C. | >800° C. |
| Conductivity | Yes | Yes (only in $H_2O$) | No | Yes (>800° C. and in $H_2O$) |
| Solubility | Organic and $H_2O$ | $H_2O$ | Organic | $H_2O$ |
| Corrosion | Low | Very high | None | Low |
| Volatility | None | High | Very high | None |

Again, the present Invention is directed to novel well treatment fluids (and the methods or techniques to deploy those fluids) that comprise an "ionic liquid." For present purposes, an ionic liquid is defined as a substance having the following characteristics:

liquid at "ambient" temperatures; and consists solely of a cation and an anion.

For present purposes, the term "ambient" means that the ionic liquid is in a liquid state over temperature ranges that are likely to be encountered in the environment in which the ionic liquid-based fluids of the present Invention will be used. Hence for matrix treatments performed in Alaska, the ambient or surrounding temperature may be, e.g., −50° C. An ionic liquid comprising the fluids of the present Invention must be liquid at that temperature. Hence the term "ionic liquid" is defined functionally, but specific examples are provided here to enable to skilled engineer to select and design a proper treatment regime using an ionic liquid-based fluid of the present Invention. Practically speaking, the total number of (known) compounds that satisfy these two constraints is not large; smaller still is the group that has been studied in detail. See, e.g., J. Sun, et al., *Room-Temperature Molten Salts Based on the Quaternary Ammonium Ion*, 102 J. Phys. Chem. B. 8858 (1998).

Ionic Liquids have a variety of properties that make them an ideal component in matrix treatment fluids. First, preferred species of ionic liquids have a wide liquidus range that includes ambient temperature—in some cases this range is 300° C. See, e.g., Johnathon G. Huddleston, et al. Room Temperature Ionic Liquids As Novel Media For 'Clean' Liquid-Liquid Extraction, Chem. Commun. 1765 (1998). Additionally, the favorable viscosity and density characteristics of ionic liquids is likewise well-documented. See, e.g., J. Fuller, et. al., J. Chem. Soc. Commun. 299 (1994); J. S. Wilkes and M. J. Zaworotko, J. Chem. Soc. Commun. 965 (1992). Other investigators have demonstrated the excellent thermal stability of ionic liquids. See, e.g., K. R. Seddon, Room-Temperature Ionic Liquids: Neoteric Solvents for Clean Catalysis 37 Kinetics and Catalysis 743, 746 (1996)); their lack of effective vapor pressure (Id.); and that they are relatively inexpensive and easy to prepare (discussed below). Similarly, the extraordinary ability of certain species of ionic liquids to dissolve a broad range of moieties—organic, inorganic, polar, ionic, polymeric, and so forth—has also been well documented. Id.

The preparation of ionic liquids is well without the routine skill level of the skilled technician. Most of the particularly preferred species discussed herein can be obtained from a chemical supply firm. For details regarding the preparation of ionic liquids, see, e.g., Charles L. Hussey, Room-Temperature Molten Salts, 5 Adv. Molten Salt Chem. 185, 188 (1983); U.S. Pat. No. 5,827,602, Hydrophobic Ionic Liquids, assigned to Covalent Associates Incorporated, 1998 (e.g., col. 6, Examples 1–3); U.S. Pat. No. 5,731,101, Low Temperature Ionic Liquids, assigned to Akzo Nobel N. V., 1998 (e.g., col. 3, Examples 1–2); U.S. Pat. No. 5,552,241, Low Temperature Molten Salt Compositions Containing Fluoropyrazolium Salts, assigned to Electrochemical Systems, Inc., 1996 (e.g., col. 9, Example 1); and U.S. Pat. No. 4,624,754, Ionic Liquid Compositions for Electrodeposition, G. McManis et al., inventors (unassigned), 1986 (e.g., col. 3, 1. 21). Each of these United States Patents is hereby incorporated by reference in its entirety, and in particular those portions indicated following each reference. The material incorporated by reference is specifically intended to indicate that methods of preparation of ionic liquids is well within the routine knowledge of one skilled in the relevant art; in addition, the material is intended to indicate additional ionic liquid species which may be used in fluids of the present Invention.

The preferred species of ionic liquids that comprise the novel treatment fluids of the present Invention shall now be discussed. Although some overlap exists, the preferred species depends largely upon the particular technique (from among the three recited earlier) one intends to apply.

Applied Research related to ionic liquids has focused largely upon two structural backbones for the cation: 1,3-dialkylimidazolium and 1-alkylpyridinium. See, e.g., Charles L. Hussey, 60 Pure & Appl. Chem. 1763 (1988) (a thorough treatise on ionic liquid research to date, incorporated by reference in its entirety). Within these two genera, 1-ethyl-3-methylimidazolium and N-butylpyridinium and slight derivatives of these two compounds are the most widely studied species. These two compounds are shown below:

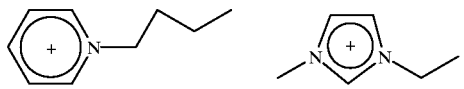

In addition to N-butylpyridinium, both N-ethylpyridinium and N-propylpyridinium are both useful in the current invention.

For the first technique, acid generation, the skilled treatment designer would for instance, consider the following variables: hydrophobicity, moles of acid produced per mole of ionic liquid, the non-acid end product (e.g., whether it is useful as a corrosion inhibitor). Based upon these considerations, 1-ethyl-3-methylimidazolium tetrachloroaluminate is a particularly preferred species. This particular species is unquestionably one of the most widely studied ionic liquid. See, e.g., Yves Chauvin, Nonaqueous Ionic Liquids As Reactive Solvents: These Mixtures of Quaternary Ammonium Salts and Ogano-Aluminum Compounds Are Very Effective Solvents For Metal-Catalyzed Olefin Dimerization and Metathesis, Chemtech, 26, September (1995); Charles L. Hussey, Room Temperature Haloaluminate Ionic Liquids Novel Solvents for Transition Metal Solution Chemistry, 60 Pure & Appl. Chem. 1763, 1765 (1988). This species is preferred as an acid-generating ionic liquid as a crucial component in a matrix treatment fluid for several reasons. Perhaps most importantly, since proton generation occurs through a displacement reaction with the chlorine atoms bound to the aluminum center, therefore, an ionic liquid having $AlCl_4^-$ generates three moles of acid per mole of the ionic liquid species.

Additionally, one investigator has found that ionic liquids having a wide liquidus range within the ambient temperature region can be prepared using the methylimidazolium as the skeleton structure. J. S. Wilkes, 21 Inorg. Chem. 1263 (1982). Moreover, the R group (bound to the other nitrogen heteroatom) can be manipulated to fine tune the properties of the ionic liquid (e.g., to optimize hydrophobicity).

Besides imidazolium, the pyridinium moiety is another common backbone from which ionic liquids are prepared (with the typical anions), for instance, 1-butylpyridinium tetrachloroaluminate. See, e.g., Hussey, 12 Pure & Appl. Chem. At 1763. For the latter two techniques, the key characteristic of ionic liquids is not acid generation upon contact with water, but the solvent characteristics. Hence, investigators have demonstrated that ionic liquids having as their anion either $BF_4^-$ or $PF_6^-$ are generally stable in the presence of water. See, e.g., Huddleston, et al., Chem. Commun. 1765. More specifically, butylmethylimidazolium hexafluorophosphate is a demonstrably superior solvent. As evidenced by laboratory data recorded in the above reference, it is a solvent comparable to the benchmark octanol. Id. It readily dissolves polar, non-polar, and even ionic species. Id. Other investigators have shown that preferred species of ionic liquids dissolve rocks, coal, and other organic materials. Freemantle, C&E News 33. In addition, the Inventors of the present Invention have found that 1-ethyl-3-methylimidazolium tetrachloroaluminate, a preferred ionic liquid of the present Invention, forms two phases with diesel at room temperature, and is fully miscible with diesel (a common component of well treatment fluids) at 160° F.

With respect to all three different applications of ionic liquids disclosed and claimed herein, numerous techniques are known to the skilled practitioner for adjusting or fine tuning the properties of ionic liquids depending upon the purpose one has in mind. For instance, one group of investigators has determined that by manipulating $AlCl_3$ content, (>50 mol %) the melting point of certain ionic species can be depressed to ambient temperature range. See, e.g., B. Vestergaard, et al., 140 J. Electrochem. Soc. 3108 (1993). Similarly, another group has discovered that the melting point of candidate ionic liquid can be depressed so that it approaches ambient range, by preparing the ionic liquid using the Bis(trifluoromethyulsulfonyl)imide [$(CF_3SO_2)_2N^-$] anion. Sun, 102 J. Phys. Chem. 8858. Additionally, another group of investigators has determined that, while as a general rule quaternary ammonium salts having an aggregate chain length less than about 20 carbon atoms are not liquid at ambient temperatures, in fact reduction of the chain symmetries can dramatically decrease melting point (into ambient range). J. E. Gordon and G. N. Subha Rao, 100 J. Am. Chem. Soc. 7445 (1978). For instance, butyl-pentyl-octyl-propyl ammonium bromide melts below room temperature, in contrast to conventional teaching. Id. Similarly, these tetraalkylammonium salts also are liquid at ambient temperatures: $(n-C_6H_{13})(C_2H_5)_3N^+N^-(SO_2CF_3)_2$ (m.p.=−20° C.), and $(n-C_6H_{13})(C_4H_9)_3N^+N^-(SO_2CF_3)_2$ (m.p.=−26° C.). J. Sun, et al. 102 J. Phys. Chem. 8858.

With respect to the anions, prior research has confirmed that these have a marked effect on the properties of ionic liquids. From the literature references cited above, the following anions are suitable constituents of ionic liquids comprising fluids of the present Invention: $BF_4^-$, $PF_6^-$, $SbF_6^-$, $CF_3SO_3^-$, $CuCl_2^-$, $AlCl_4^-$, $RAlCl_3^-$, $R_2AlCl_2^-$, $CuCl_2^-$, $Cu_2Cl_3^-$, $Cu_3Cl_4^-$, $Al_2Cl_7^-$, $Al_3Cl_{10}^-$, $NO_3^-$, and $(CF_3SO_2)_2N^-$, $Br^-$, $ClO_4^-$, $CH_3COO^-$, and $BPh_4^-$. Again $BF_4^-$, $PF_6^-$ are preferred anions for ionic liquids for which water stability is desired, while $AlCl_4^-$ is a particularly preferred anion comprising ionic liquids to be used in acid-generation. Selected particularly preferred species are shown in Table 2.

TABLE 2

| Preferred Species/Genus: | Application | | | Literature Reference |
|---|---|---|---|---|
| | Acid Generation | Solvent | Carrier Fluid | |
| 1-methyl-3-ethylimidazolium tetrachloroaluminate | X | | | Charles L. Hussey, Room Temperature Haloaluminate Ionic Liquids Novel Solvents for Transition Metal Solution Chemistry, 60 Pure & Appl. Chem. 1763, 1765 (1988). |
| 1-methyl-3-ethylimidazolium tetrabromoaluminate | X | | | Charles L. Hussey, Room Temperature Haloaluminate Ionic Liquids Novel Solvents for Transition Metal Solution Chemistry, 60 Pure & Appl. Chem. 1763, 1765 (1988). |
| Anion = $PF_6^-$, $BF_4^-$ | | X | X | J. G. Huddleston, et al. Room Temperature Ionic Liquids as Novel Media for 'Clean' Liquid-Liquid Extraction, Chem. Commun. 1765 (1998). |
| Butylmethylimidazolium hexafluorophosphate | | X | X | Id. |
| N-butylpyridium tetrachloroaluminate | X | | | Id. |
| N-alkylpyridinium tetrahaloaluminates | X | | | Id. |
| Tetraalkyl-ammonium $[(CF_3SO_2)_2N^-]$ Where C < 12, with substantial chain dissymmetry | | | | J. Sun, Room Temperature Molten Salts Based on the Quaternary Ammonium Ion, 102 J. Phys. Chem. 8858 (1998). (to depress the melting point of candidate IL's so that it approaches ambient range) |
| IL's having as their anion, Bis(trifluoro-methyulsulfonyl)-imide $[(CF_3SO_2)_2N^-]$ | | | | J. Sun, Room Temperature Molten Salts Based on the Quaternary Ammonium Ion, 102 J. Phys. Chem. 8858 (1998). |

EXAMPLE 1
Dissolution by Ionic Liquid-Based Fluids

This example describes results of laboratory studies which demonstrate the efficacy of ionic liquids in a variety of stimulation and workover techniques. First an ionic liquid was prepared according to the following reaction schematic:

$$RX + MX_n \rightarrow R^+ MX_n^-$$

where R is 1-ethyl-3-methylimidazolium, X is chloride, and $MX_n$ is $AlCl_3$. The two reagents were combined in a 1:1 molar ratio. Upon reaction, a liquid was produced. The reaction was highly exothermic, as expected. In the next step, acid was prepared form the product formed in the reaction above, simply by adding water to the product of the reaction above, according to the following reaction schematic:

$$R^+MX_n^- + H_2O \rightarrow H^+ + X^- + RX + MX_{n-1}(OH); \text{ and}$$

$$MX_{n-1}(OH) + H_2O \rightarrow H^+ + MX_{n-2}(OH)_2 + X$$

The choice of M, R, and X are based on the criteria identified above, in addition to the particular species also identified above. What does matter is that an ionic liquid is formed. Again, as we have indicated above, the precise composition of the ionic liquid—i.e., of the two components that make up the ionic liquid matter—can be varied depending upon the particular application. Modification or optimization of this sort is well within the knowledge of one skilled in the art of treatment design and execution. For instance, if a particular matrix treatment requiring unusually precise zonal control—i.e., the treatment fluid must be directed at the producing zone and not at the contiguous water-producing zone—then the treatment designer may wish to prepare an ionic fluid of more hydrophobic character, hence 1-butyl-3-ethylimidazolium tetrachloroaluminate may be preferred over, e.g., 1-methyl-3-methylimidazolium tetrafluorobromate. This example helps to illustrate two unique features of ionic liquids, which enables ionic liquids to perform as critical ingredients in workover and stimulation treatments.

EXAMPLE 2
$CaCO_3(s)$ Dissolution by Ionic Liquid-Based Fluids Compared with Dissolution by a Conventional System This example also describes results of laboratory studies that demonstrate the efficacy of ionic liquids in a variety of stimulation and workover techniques. In particular, the purpose of this experiment was to measure the rate of $CaCO_3$ dissolution by an ionic liquid compared with $CaCO_3$ dissolution rate by HCl, a conventional treatment of choice.

The selection of the proper amount of ionic liquid used in the treatment fluid, as well as the selection of additive type (e.g., surfactant, de-emulsifier, etc.) and concentration, pumping rate, pumping time, and total fluid volume, is virtually impossible to specify ex ante. Indeed, each parameter just recited is determined by the skilled engineer/scientist for each individual treatment job, based primarily upon the geology and geochemistry of the reservoir, type and extend of formation damage, and any particular difficulties (e.g., contiguous water zone). Hence, additional testing—beyond what is ordinarily and routinely required with conventional fluids—to design a well treatment using the fluids of the present Invention, is minimal.

Again, HCl-based treatment fluids are severely limited efficacy in removing formation damage due in part to its high reaction rate—i.e., it is spent within a few inches of the wellbore. Therefore, what is desired is slow $CaCO_3$ dissolution, to allow the treatment fluid to migrate radially into the formation so that a unreacted fluid reaches more distal portions of the formation.

First, the ionic fluid was prepared from the two starting materials: 1-ethyl-3-methylimidazolium chloride and aluminum trichloride. Both of these materials are in solid form at room temperature prior to mixture (the former is a crystalline substance; the latter, a powder). The two components were combined in about equimolar amounts (4.4 g imidazolium, F.W.=146.2; 4.0 g $AlCl_3$, F.W.=133.34. The reaction began almost immediately with only modest shaking of the reaction vessel; within moments the product ionic liquid, 1 -ethyl-3-methylimidazolium tetrachloride, was formed, as evidenced by the transformation of all of the two solids into a pure liquid. The liquid was a greenish color, due to contaminants present in the two starting materials. Without contaminants present, the ionic liquid product should be colorless. Almost immediately upon combining the two starting materials, the pyrex reaction vessel became hot to the touch, until it could no longer be handled through ordinary laboratory disposable plastic gloves. Substantial heat was generated throughout the reaction. Again, the immediate and sustained generation of substantial heat can be exploited as a separate (or subsidiary) damage-removal mechanism.

Once the ionic liquid product was formed, then its ability to slowly dissolve $CaCO_3$ was assessed and compared with the dissolution rate (and extent) of HCl. Two 500 ml beakers of deionized water are placed side-by-side. Into each beaker is placed a 1.1 g rectangular block of $CaCO_3$. The block sits at the bottom center of the beaker. Next, 5.7 ml of a 37% HCl solution is injected into one beaker; and 6 ml of the ionic liquid prepared above is injected into the other beaker.

Reaction of the ionic liquid or HCl was verified by the appearance of $CO_2$ generation, observed visually as bubbles rising to the surface. $CaCO_3$ dissolution was far quicker in the HCl-containing beaker than in the beaker containing the ionic liquid. After a few minutes, the two vessels were vigorously shaken to enhance the dissolution rate of the HCl beaker, though this appeared to have no effect on the ionic liquid beaker. These results clearly demonstrated that the dissolution rate in the ionic liquid beaker is very slow compared with the HCl beaker.

After two hours, the $CaCO_3$ blocks were removed and weighed. The $CaCO_3$ block in the HCl beaker had completely dissolved—100% dissolution. The block in the ionic liquid beaker had dissolved only 13%.

Based on these data, a matrix treatment with very long shut-in times—much longer than conventional shut-in times which average about 12 hours—may be preferred, for instance, 36–48 hours, perhaps longer, to take advantage of the ionic liquids slow reaction rate. Again, this show reaction rate is expected to translate into deeper radial penetration. Moreover, based on the preceding comparative example, the skilled treatment designer can make reasonable inferences about the concentration (or amount) of ionic liquid to use in an actual acid treatment.

Having demonstrated in Examples 1 and 2 a reasonable expectation of operability of the ionic liquid-based fluids of the present Invention, the skilled treatment designer is directed to the voluminous, specialized literature on the basic chemistry of ionic liquid, some of which was recited and incorporated by reference earlier. From this literature, the skilled artisan can select other ionic liquid species that meet the specific parameters of operability in a oilfield services applications, and in particular in acid treatments.

Suggested Mechanism of Acid Dissolution

Damage dissolution by an ionic liquid-based fluid (in conjunction with water) of the present Invention is roughly a two-step process. In the first step, an acid is formed by reaction with water. This is essentially a substitution reaction in the case an ionic liquid in which $AlCl_4^-$ is the anion. Hence, with reaction of the first water molecule, $AlCl_4^-$ is transformed to $AlCl_3(OH)^-$. This substitution continues until $Al(OH)_3$ is produced along with three protons, $H^+$. Hence, three moles of acid results from one mole of $AlCl_4^-$. Once the acid is formed, then the protons react with $CaCO_3$ to eventually form gaseous $CO_2$.

Certain attributes of preferred species (e.g., aromatic heterocyclic ring systems in which the anion is $AlCl_4^-$) are expected to impart significant cost advantages to the fluids of the present Invention. First, for these preferred species, three moles of acid is generated from one mole of reactant (provided the reaction proceeds to completion). Another ubiquitous problems that limits the desirability of acid treatments is the corrosion of the pumping equipment and well casings, caused by contact with the acid (worse in the case of more concentrated solutions of mineral acids). The present Invention addresses this problem in two significant ways. First, the acid—which is responsible for the corrosion—is generated very slowly by the ionic liquid-based fluids of the present Invention, which will prevent acid contact with the upstream components (storage tanks, pumps, upper casings, etc.) Second, to solve the corrosion problem, conventional acid treatments often add a corrosion inhibitor to the fluid. In the case of certain preferred species of the ionic liquid-based fluids of the present Invention, a corrosion inhibitor is generated intrinsically, upon formation of the acid, without the need to add on. This is particularly significant since the corrosion inhibitor is often a significant portion of the total cost of an acid treatment.

Specific Types of Damage Treated by Ionic Liquid-Based Fluids

The efficiency of a matrix treatment depends primarily upon removing the damage that restricts productivity. This restriction is generally shown by an overall diminished production level or a sharper-than-expected decline in production. Pressure transient analysis is a common technique for estimating the extent of damage. The physical characteristics, not the origin of the damage determine the selection of the proper treating fluid. Therefore, one fluid that is effective on one type of damage will generally be effective, regardless of the cause of the damage. The sources of formation damage are: drilling, cementing, completion, gravel packing, production, stimulation, and injection. At least eight basic types of damage are known to occur. These are: emulsion, wettability change, water block, scales (inorganic deposits), organic deposits, (mixed deposits) silts & clays, and bacteria.

A preferred conventional technique to treat emulsion-based damage is to break/destabilize the emulsion. As evidenced by their excellent solubility characteristics, the ionic liquid-based fluids of the present Invention can be employed to treat emulsion damage.

Scales are precipitated mineral deposits, and can form when incompatible waters combine, e.g., formation water and either a fluid filtrate or injection water. The most common type of scale is carbonate scales: $CaCO_3$, and $FeCO_3$, of which the former is by far the most common. The conventional treatment for carbonate scales is HCl. The ionic liquids of the preferred embodiments are roughly interchangeable with HCl, as evidenced by, Examples 1 and 2 above. Indeed, a primary mechanism of damage removal by the fluids of the present Invention is by dissolution by acid. Therefore, the fluids and techniques of the present Invention are readily operable on carbonate scales. Other types of scales particularly treatable by the fluids and techniques of the present Invention include chloride scales (e.g., NaCl), iron scales (e.g., FeS, $Fe_2O_3$), silica scales (e.g., $SiO_2$), hydroxide scales (e.g., $Mg(OH)_2$). In certain instance—e.g., iron scales—the skilled engineer may wish to formulate a fluid of the present Invention that additionally comprises a reducing agent, or sequestrant (e.g., EDTA). In the case of silica scales, a fluid of the present Invention should be prepared using HF.

The ionic liquid-based fluids of the present Invention are also useful in the dissolution of organic deposits (paraffins and asphaltenes). Generally speaking, organic deposits are very difficult to remove. The dissolution of organic deposits can be removed by at least two different mechanisms in accordance with the present Invention. First, the ionic liquids that make up the novel treatment fluids of the present Invention are formed in accordance with the general reaction schematic of FIG. 1. Even formation of a small amount (10 g) cause the reaction production to reach temperatures of about 200° F. This is significant since paraffins and asphaltenes dissolve at temperatures substantially below this; moreover, melted paraffin is completely miscible in ionic liquids. Second, an ionic liquid-based fluid can be used to dissolve solid organic deposits.

It should be noted that in conventional acid treatments (e.g., HCl), asphaltene, paraffin and sludge (i.e., organic deposits produced from inorganic acids and crude oil) formation is a persistent and costly problem. This is particularly true since sludges cannot be dissolved; therefore the best way to control them is to prevent their formation. Hence, additives are often added to conventional acid fluids to present the formation of these substances. These additives are generally organic solvents (e.g., xylene, polar surfactants such as dodecylbenzyl sulfonic acid). The ionic liquid-based fluids of the present Invention, in effect, contain their own intrinsic additive to control asphaltene and paraffin formation. This additive is in the form of the ionic liquids themselves, which also function as effective organic solvents.

The fluids of the present Invention can also be used to remove mixed deposits—i.e., blends of organic compounds and either scales of silts or clays. Indeed, the fluids of the present Invention are particularly suitable for removal of these mixed systems, for the reason that the conventional treatments utilize a blend of mineral acid and organic solvent to treat these systems. But again, the ionic liquid-based fluids of the present Invention are actually an already blended fluid, since they contain both an acid (formed by the addition of water) and an organic cation. Therefore, even mixed deposits can be treated with a single fluid of the present Invention. The skilled treatment designer can control whether the organic fraction (in contrast to the inorganic fraction) is attacked first by for instance, manipulating the amount and rate of water addition to the ionic liquid. Thus, the mixed deposit can be contacted first with a pure ionic liquid solution which should preferentially degrade the polymer fraction, then water can be injected to contact the ionic liquid, hence generating acid to degrade the mineral portion.

Silts and clay damage are readily treated with the fluids of the present Invention. Conventional treatment fluids are HCl-based systems; again, the fluids of the present Invention are essentially interchangeable with such systems. In sandstone formations, HF is often combined with HCl. Similarly, HF can be added to the fluids of the present Invention, since ionic fluids are highly stable solvents.

Another type of formation/wellbore damage is bacteria, including sulfate-reducing bacteria, iron (manganese) bacteria, and slime formers. Certain preferred species of ionic liquids that comprise the fluids of the present Invention—in particular the quaternary ammonium salts are highly toxic to bacteria and other microorganisms. Therefore certain preferred fluids of the present Invention are effective at treating damage due to bacteria.

Additives

Again, a broad advantage of the fluids of the present Invention lies in their simplicity. In a conventional acid system, numerous additives must be combined with the acid to inhibit corrosion, prevent organic deposits, eliminate emulsions, to prevent iron precipitation, and so forth. In the ionic liquid-based fluids of the present Invention, the additive package is far smaller compared with conventional treatments, which reduces the overall cost of these novel fluids, as well as making them much easier to pump in a commercial setting, since less equipment (additional tanks, pumps, etc.) is required. For instance, the most expensive and most ubiquitous additive is a corrosion inhibitor. In the fluids of the present system, a corrosion inhibitor is either not needed or needed in far concentrations. The reasons are: (1) acid formation from preferred species of ionic liquids generates a corrosion inhibitor (e.g., conventional corrosion inhibitors include nitrogen heterocycles); and (2) acid is not formed until water is added, and even then is formed very slowly, therefore corrosion, particularly of above-ground components is far less severe than with conventional systems in which acid is present throughout the entire pumping cycle.

In addition, many other common additives mixed with conventional acid-treatment fluids are organic polymers, e.g., surfactants, mutual solvents, etc. The fluids of the present Invention are based on ionic liquids which are excellent, highly stable solvents, and therefore are miscible with and stable in the presence of many types of organic polymers. Moreover, to the extent that the organic polymer-based additives merely mimics a property intrinsic to the ionic liquids of the present Invention, then reduced amounts of these additives may be acceptable depending upon the particular application. For the same reason, in certain instances, the skilled engineer may be able to dispense with some of these additives altogether.

In certain instances, it may be desirable to gel, or increase the viscosity of the treatment fluid. In this instance, a preferred ionic liquid of the present Invention is 1-ethyl-3-methylimidazolium tetrachloroaluminate. This species is fully miscible with diesel and forms a viscous gel upon contact with water. This ionic liquid is not, however, miscible with guar, but is completely miscible upon the addition of water. In addition, the ionic liquid-based fluids are compatible with viscoelastic surfactants ("VES.") These can be used as gelling agents—i.e., to increase the viscosity of the fluids of the present Invention. The term "VES" as used herein means "viscoelastic surfactant." Preferred viscoelastic surfactants are disclosed in the following patents and patent applications, each assigned to Schlumberger Technology Corporation, and is incorporated by reference in its entirety. U.S. Pat. No. 5,258,137, Viscoelastic Surfactant Based Foam Fluids, assigned to Schlumberger Technology Corporation,1993; U.S. Pat. No. 5,551,516, Hydraulic Fracturing Process and Compositions, Schlumberger Technology Corporation, 1996 ; U.S. Pat. application Ser. No. 08/727,877, Methods of Fracturing Subterranean Formations, assigned to Schlumberger Technology Corporation, filed Oct. 9, 1996; U.S. Pat. application Ser. No. 08/865,137, Methods for Limiting the Inflow of Formation Water and for Stimulating Subterranean Formations, assigned to Schlumberger Technology Corporation, filed May 29, 1997; U.S. Pat. appication Ser. No. 09/166,658, Methods of Fracturing Subterranean Formations, assigned to Schlumberger Technology Corporation, filed Oct. 5, 1998.

EXAMPLE 3

A Matrix Acidizing Treatment Using the Ionic Liquid-Based Fluids of the Present Invention The skilled well-treatment designer is sufficiently familiar with the essential features common to all matrix acidizing treatments. For discussions of varying levels of generality, the skilled designer is referred to the following U.S. Patents: U.S. Pat. No. 4,448,708, Use of Quaternized Polyamidoamines as Demulsifiers, assigned to Schlumberger Technology Corporation, 1984; U.S. Pat. No. 4,430,112, Aqueous Acid Compositions and Method of Use, assigned to Schlumberger Technology Corporation, 1984; U.S. Pat. No. 3,122,203, Well Washing Process and Composition, assigned to The Dow Chemical Company, 1964; U.S. Pat. No. 2,011,579, Intensified Hydrochloric Acid, assigned to The Dow Chemical Company, 1935; U.S. Pat. No. 2,094,479, Treatment of Wells, assigned to William E. Spee, 1937; and U.S. Pat. No. 1,877,504, Treatment of Deep Wells, assigned to The Dow Chemical Company, 1932. These United States Patents are hereby incorporated by reference in their entirety, and are relied upon to establish the general level of skill in the art of matrix acidizing.

In addition, the skilled designer is directed to the following articles taken from a benchmark treatise in the field of matrix acidizing, and familiar to the skilled designer: M. Economides, Reservoir Justification of Stimulation Techniques, In Reservoir Stimulation, M. Economides and K. G. Nolte, eds. 1-01 (1987); Bernard Piot and Oliver Lietard, Nature of Formation Damage, M. Economides and K. G. Nolte, eds. 12-01 (1987); Laurent Prouvost and Michael Economides, Matrix Acidizing Treatment Evaluation, M. Economides and K. G. Nolte, eds. 16-01 (1987).

The prior art references cited above (in particular the U.S. Patents) are sufficient to establish the benchmark level of skill in the art, to establish that the particular techniques necessary to do so (e.g., a typical matrix-treatment protocol) are present available to the skilled practitioner, and when combined with the disclosure recited above, to establish that the skilled practitioner possesses the knowledge and skills to practice the embodiments of the Invention, Therefore, these references, in combination with the data presented in Examples 1 and 2 indicate to the skilled practitioner, the functional interchangeability of the ionic liquid-based fluids of the present Invention with conventional fluids in methods for matrix treatment, and therefore provide the skilled practitioner with a reasonable expectation of success.

As evidenced from the references (U.S. Patents and treatises) cited above, the level of skill in the relevant art is quite high. Moreover, parameters such as pumping rate, pumping time, shut-in time, acid content, and additive package, must be determined for each particular treatment since each of these parameters depends upon the extent of the damage, formation geology (e.g., permeability), formation temperature, height of the producing zone, etc. Therefore, having established the interchangeability of the novel fluids of the present Invention for conventional fluids, the design of individual matrix acidizing treatments incorporating the novel fluids of the present Invention are well within skill of a reasonably knowledgeable and experienced matrix acidizing treatment designer.

Other Stimulation and Workover Treatments

Throughout this document, the focus has been upon matrix acidizing; nevertheless, the skilled treatment designer will immediately recognize that the teaching presented in the above disclosure is not limited to matrix acidizing treatments, but rather can be incorporated into several other related stimulation techniques. First, by increasing the pumping pressure (to above the minimum in situ rock stress), a matrix acidizing treatment becomes an acid fracturing treatment. Second, although the above disclosure was primarily directed to damage in the formation, the fluids of the present Invention could also be directed to removal of damage in the wellbore itself (which is often more formally referred to as a workover or completion technique rather than a stimulation technique) in either cased or open hole, e.g., to unplug perforations, or to remove filtercake and scale prior to cementing. More particularly, damage coating a wellbore is often comprised of the same components as damage to the formation (to which matrix acidizing treatments are directed). In addition, as indicated in the proceeding disclosure, the fluids of present Invention can be gelled (e.g., with VES), and therefore, such a fluid can be used to block water zones during water control treatments.

Thus having described the invention, we claim:

1. A matrix treatment fluid comprising an ionic liquid, said liquid in turn consisting of an organic cation and an inorganic anion, said organic cation selected from the group consisting of 1,3-dialkylimidazolium and 1-alkylpyridinium; and wherein said anion is selected from the group consisting of $BF_4^-$, $PF_6^-$, $SbF_6^-$, $CF_3SO_3^-$, $AlCl_4^-$, $CuCl_2^-$, $Cu_2Cl_3^-$, $Cu_3Cl_4^-$, $Al_2Cl_7^-$, $Al_3Cl_{10}^-$, $NO_3^-$, and $(CF_3SO_2)_2N^-$, $Br^-$, $ClO_4^-$, $CH_3COO^-$, and $BPh_4^-$; said fluid further comprising a viscoelastic surfactant.

2. A method for treating a damaged formation penetrated by a well comprising injecting a matrix treatment composition consisting essentially of an ionic liquid.

3. The method of claim 2 wherein the well under treatment is shut in for about 10 hours.

4. The method of claim 2 wherein the well under treatment is shut in for about 24 hours.

5. A method for treating a damaged formation comprising injecting a matrix treatment fluid comprising an ionic liquid, said liquid in turn consisting of an organic cation and an inorganic anion, said organic cation selected from the group consisting of 1,3-dialkylimidazolium and 1-alkylpyridinium; and wherein said anion is selected from the group consisting of $BF_4^-$, $PF_6^-$, $SbF_6^-$, $CF_3SO_3^-$, $CuCl_2^-$, $AlCl_4^-$, $Cu_2Cl_3^-$, $Cu_3Cl_4^-$, $Al_2Cl_7^-$, $Al_3Cl_{10}^-$, $NO_3^-$, and $(CF_3SO_2)_2N^-$, $Br^-$, $ClO_4^-$, $CH_3COO^-$, and $BPh_4^-$.

6. The method of claim 5 wherein said cation is 1-ethyl-3-methylimidazolium and said anion is selected from the group consisting of $AlCl_4^-$, $BF_4^-$ and $PF_6^-$.

7. The method of claim 5 wherein said anion is selected from the group consisting of $BF_4^-$ and $PF_6^-$.

8. The method of claim 5 wherein said anion is $AlCl_4^-$.

9. The method of claim 5 wherein said ionic liquid is butylmethyl imidazolium hexafluorophosphate.

10. The method of claim 5 wherein said cation is 1-alkylpyridinium:

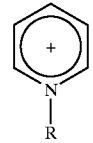

and wherein R is selected from the group consisting of —$CH_2CH_3$, —$CH_2CH_2CH_3$ and —$CH_2CH_2CH_2CH_3$ and said anion is selected from the group consisting of $AlCl_4^-$, $Al_2Cl_7$, $BF_4^-$, $PF_6^-$, and $NO_3^-$.

11. The method of claim 10 wherein said cation is 1-butylpyridinium.

12. The method of claim 10 wherein said anion is selected from the group consisting of $BF_4^-$ and $PF_6^-$.

13. The method of claim 10 wherein said anion is $AlCl_4^-$.

14. The method of claim 10 wherein said ionic liquid is 1-butylpyridinium nitrate.

15. The method of claim 10 wherein said ionic liquid is 1-butylpyridinium hexafluorophosphate.

16. The method of claim 10 wherein said ionic liquid is 1-butylpyridinium tetrachloroaluminate.

17. A method for treating a damaged formation comprising injecting a matrix treatment fluid comprising liquid, said liquid in turn consisting of an organic cation and an inorganic anion, said organic cation is butyl-pentyl-octyl-propylammonium, and wherein said anion is

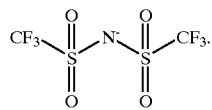

18. The method of claim 2 wherein the matrix treatment composition further comprises a viscoelastic surfactant.

19. The method of claim 2 wherein the matrix treatment composition further comprises an aqueous solution.

20. The method of claim 2 wherein the matrix treatment composition further comprises water.

21. A matrix treatment fluid comprising an ionic liquid, said liquid in turn consisting of an organic cation and an inorganic anion, said organic cation selected from the group consisting of 1,3-dialkylimidazolium and 1-alkylpyridinium, and said anion is selected from the group consisting of $BF_4^-$, $PF_6^-$, $AlCl_4^-$, and $Al_2Cl_7^-$, further comprising an acid, wherein said acid is a super acid consisting essentially of HF and $SbF_5$.

22. The matrix treatment fluid of claim 21 wherein said ionic liquid consists essentially of 1-ethyl-3-methylimidazolium tetrafluoroborate.

23. The matrix fluid of claim 21 wherein said ionic liquid consists essentially of butylmethyl imidazolium hexafluorophosphate.

24. The matrix fluid of claim 21 wherein said ionic liquid consists essentially of 1-butylpyridinium hexafluorophosphate.

25. The matrix treatment fluid of claim 21 wherein said ionic liquid consists essentially of 1-alkyl-3-alkylimidazolium tetrachloroaluminate.

26. The matrix treatment fluid of claim 21 wherein said ionic liquid consists essentially of 1-ethyl-3-methylimidazolium tetrachloroaluminate.

27. The matrix treatment fluid of claim 1 wherein said cation is 1-ethyl-3-methylimidazolium.

* * * * *